United States Patent [19]

Tanaka

[11] Patent Number: 4,721,759

[45] Date of Patent: Jan. 26, 1988

[54] RESIN COMPOSITION FOR LIGHTWEIGHT FOAM CONCRETE REINFORCING STEEL STRUCTURE

[75] Inventor: Takeyuki Tanaka, Chigasaki, Japan

[73] Assignee: Nippon Oil and Fats Co., Ltd., Tokyo, Japan

[21] Appl. No.: 6,229

[22] Filed: Jan. 23, 1987

[30] Foreign Application Priority Data

Jan. 24, 1986 [JP] Japan .................................. 61-13429

[51] Int. Cl.$^4$ ............................................. C08G 18/30
[52] U.S. Cl. ..................................... 525/528; 525/528; 525/930; 528/45; 528/48; 528/85; 528/905
[58] Field of Search ...................... 528/45, 48, 85, 905; 525/528, 930; 427/373, 388.2

[56] References Cited

U.S. PATENT DOCUMENTS 4,507,412  3/1985  Hickner et al. ...................... 525/528
4,526,912  7/1985  Biorcio et al. ...................... 525/528

Primary Examiner—Maurice J. Welsh
Assistant Examiner—S. A. Acquah
Attorney, Agent, or Firm—Birch, Stewart, Kolasch & Birch

[57] ABSTRACT

A resin composition with which to coat a steel structure used as a reinforcement, in a lightweight foam concrete produced under the condition of high temperature, high pressure and high alkalinity. The resin composition with which to coat a steel structure comprises a phenoxy resin and a hardening agent having a blocked isocyanate group.

12 Claims, No Drawings

RESIN COMPOSITION FOR LIGHTWEIGHT FOAM CONCRETE REINFORCING STEEL STRUCTURE

FIELD OF THE INVENTION AND RELATED ART STATEMENT

The present invention relates to a resin composition with which to coat a steel structure for reinforcing a lightweight foam concrete.

Hitherto, to enhance adhesion between a lightweight foam concrete and a reinforcing steel structure (hereinafter referred to simply as "steel structure"), a process has been used in which the steel structure is dip coated with a cement-based coating agent comprising a mixture of cement, silica sand and water, the coating agent is hardened, then the steel structure is embedded into a lightweight coat concrete component comprising a blend of cement, silica sand, water and a foaming agent, and reaction is effected ordinarily under the conditions of 180°±20° C. and 10±2 atm for 8 to 12 hours to produce a lightweight foam concrete reinforced with the steel structure.

However, the adhesion between the lightweight foam concrete component and the cement-based coating agent applied to the steel structure is unsatisfactory, and the film of the cement-based coating agent applied to the steel structure is brittle. Therefore, during transportation of a building material comprising a lightweight foam concrete reinforced with a steel structure, during building of a house by using the lightweight foam concrete or when a wall surface of a lightweight foam construction is distorted due to an earthquake or the like, the steel structure and the lightweight foam concrete might be separated from each other at the boundary surface part thereof, leading to deterioration of physical properties of the lightweight foam concrete or, further, to rusting of the steel structure, resulting in corrosion of the steel structure.

Although the surface of the steel structure is seemingly smooth, it has numerous minute recesses of about 1 $\mu$m to 3 mm in size. Attention has been paid to the fact that when a coating material has filled to eliminate foam parts from the surface of a steel structure, causes of rusting present in the environment does not make contact the steel structure, so that rusting will not easily occur. However, since in the case of the present invention the steel structure is placed in the lightweight foam concrete component and molding is conducted in the conditions of high temperature, high pressure and high alkalinity, it is necessary that the film of the composition applied to the steel structure under the conditions will not be decomposed by heat or alkali. For this, the resin used as a component of the composition should have a high molecular weight, and to ensure that the lightweight foam concrete component is not broken due to expansion of the film, it should have a network structure. In addition, it has been found that for obtaining good adhesion between the steel structure coated with the resin composition and the lightweight foam concrete component, it is effective that the film is softened at the molding temperature and the lightweight foam concrete component bites into the film. Based on the findings, the present invention has been attained.

OBJECT AND SUMMARY OF THE INVENTION

An object of the present invention is to provide a resin composition for a lightweight foam concrete reinforcing steel structure which ensures good adhesion of a lightweight foam concrete component to a steel structure used as a reinforcement in producing a lightweight foam concrete under the conditions of high temperature, high pressure and high alkalinity.

Another object of the present invention is to provide the resin composition for a lightweight foam concrete reinforcing steel structure which endures the conditions of high temperature, high pressure and high alkalinity.

Still another object of the present invention is to provide the resin composition which is improved in rust-preventive property.

The present invention relates to a resin composition with which to coat a steel structure used as a reinforcement, in a lightweight foam concrete produced under the conditions of high temperature, high pressure and high alkalinity, e.g., a high temperature of 180°±20° C., a high pressure of 10±2 atm and a high alkalinity of pH 10 or higher. More particularly, the present invention relates to a resin composition with which to coat a steel structure, comprising 60 to 95% by weight of a phenoxy resin and 5 to 40% by weight of a hardening agent having a blocked isocyanate group.

DETAILED DESCRIPTION OF THE INVENTION

The present invention relates to a resin composition comprising 60 to 95% by weight of a phenoxy resin and 5 to 40% by weight of a hardening agent having a blocked isocyanate group.

The phenoxy resin is resistant to heat, is not thermally decomposed in 3 to 4 hours at 200° C. and has good adhesiveness to steel.

As the phenoxy resin, there may be used, for example, those available under trade names of PKHH and PKHC from Union Carbide Corp., those available under trade names of Phenotohto YP-50, YP-50-C25 and YP-50-NT25 from Tohto Kasei Co., Ltd.

However, the phenoxy resin, when used singly, shows a high thermal expansion. Therefore, a hardening agent having a blocked isocyanate group is added to the phenoxy resin, and baking is conducted to form a three-dimensional network structure, whereby the object of the present invention can be achieved.

The hardening agent having a blocked isocyanate group can be obtained by reacting a polyisocyanate compound with a compound having active hydrogen.

The polyisocyanate compound is a compound having at least two isocyanate groups in one molecule, and examples thereof include:

aliphatic compounds such as diisocyanates of ethylene, propylene, tetramethylene, hexamethylene, decamethylene, lysine, etc.; alicyclic compounds such as diisocyanates of 1,3-cyclopentane, 1,2-cyclohexane, 1,4-cyclohexane, isophorone, etc.; aromatic compounds such as diisocyanates of 2,4-tolylene, 2,6-tolylene, 4,4'-diphenylenemethane, 4,4'-toluidine, 1,4-xylylene, etc.

Other than the abovementioned compounds, there may be also used dimers, trimers, polyol adduct derivatives and the like of these compounds.

As the compound having active hydrogen, there may be used, for example, alcohols such as methanol, ethanol, propanol, butanol, hexanol, cyclohexanol, benzyl alcohol, ethylene glycol monoethyl ether, ethylene glycol monobutyl ether, etc.; compounds having a phenolic hydroxyl group such as phenol, cresol, etc.; oximes such as acetoxime, methyl ethyl ketoxime, etc.;

lactams such as 68-caprolactam, β-caprolactam, 70-valerolactam, etc.; imides; imidazoles; carbamates; mercaptans, etc.

If the amount of the hardening agent having the blocked isocyanate group is less than 5% by weight, the softening degree of the coating film is high and the adhesion thereof to the lightweight foam concrete is good, but the coefficient of thermal expansion is high, leading to breakage of the lightweight foam concrete and poor anticorrosive property. Therefore, the amount of the hardening agent is preferably not less than 5% by weight. In addition, if the amount of the hardening agent is more than 40% by weight, the softening degree of the coating film is low and the adhesion thereof to the lightweight foam concrete is poor, leading to low anticorrosive property. Therefore, for balanced thermal expansion and adhesion, the amount of the hardening agent is preferably 5 to 40% by weight, particularly, 10 to 40% by weight.

In addition, if required, an organic solvent is used, such as acetoethylene glycol monoethyl ether, n-butyl acetate, xylene, methyl isobutyl ketone, cyclohexanone, diisobutyl ketone, isophorone, diethylene glycol monobutyl ether, pentachloroethane, 1,1,2,2-tetrachloroethane, trichloroethylene, tetrachloroethylene, 1,1,1-trichloroethane, etc.

To produce the resin composition for a lightweight foam concrete reinforcing steel structure according to the present invention (hereinafter referred to as "composition"), the abovementioned phenoxy resin, organic solvent, the hardening agent having the blocked isocyanate group and organic solvent are separately measured in containers, then they are mixed and dissolved by using a mixer such as dissolver and homomixer.

After dissolution, the solution of the phenoxy resin (main component) and the solution of the hardening agent having the blocked isocyanate group (hardening agent) are mixed with each other by the mixer. In this case, the abovementioned solvent is used, as required, to dilute the mixture to a viscosity suitable for coating.

The composition thus obtained is applied to a reinforcing steel structure by an ordinary coating method such as dip coating, air spray, airless spray and electrostatic coating, is left to stand at room temperature for 5 to 30 min, and is baked at 100° to 220° C. for 10 to 90 min, thereby hardening the coating film.

Then, the thus coated reinforcing steel structure is embedded in a lightweight foam concrete component obtained by mixing a cement, silica sand, water, a foaming agent and the like ordinarily used in production of lightweight foam concrete, then after leaving the materials to stand at room temperature for 10 to 60 min, the mold is removed, the demolded product is placed in an autoclave and is subjected to reaction under the conditions of 160° to 200° C. and 8 to 12 atm for 6 to 16 hours, whereby a lightweight foam concrete reinforced with a coated steel structure is obtained.

The present invention will now be explained more in detail referring to Examples and Comparative Examples as follows. In the following description, parts are parts by weight, and % is % by weight.

EXAMPLE 1

In 75 g of acetoethylene glycol monoethyl ether is dissolved 25 g of a phenoxy resin (trade name: PKHH, a product by Union Carbide Corp.) to prepare a solution of solid content of 25% (main component). Further, 60 g of a phenol block of 2,4-tolylene diisocyanate (trade name: Coronate AP-60, a product by Nippon Polyurethane Industry Co., Ltd.) is dissolved in 40 g of n-butyl acetate to prepare a solution of a solid content of 60% (hardening agent). A composition is prepared by mixing 95.6 parts of the main component and 4.4 parts of the hardening agent (solid content weight ratio: 90 parts/10 parts), and is placed in an immersion tank of 100 mm in diameter by 150 mm in height. A steel structure member (50 mm × 100 mm × 3 mm) is immersed in the composition for 1 min, and is taken out. After, suspending the coated steel structure member over the tank and leaving it to stand at room temperature for 15 min, baking at 170° C. was conducted for 40 min to obtain a steel structure member coated with a film of 50 μm in hardened film thickness. The steel structure thus coated with the composition is fixed at a central part of a mold for molding a lightweight foam concrete, and a mixture of 50 parts of cement, 50 parts of silica sand, 50 parts of water and 0.3 part of an aluminum paste (trade name: SAP-720N, a product by SHOWA ALUMINUM CORPORATION) is poured into the mold.

After leaving the poured material to stand for 30 min, the mold was removed, the demolded product was placed in an autoclave and was subjected to reaction under 180° C. and 10 atm for 8 hours, to obtain a lightweight foam concrete reinforced with the steel structure.

The results of performance tests on the thus obtained lightweight foam concrete are shown in Table 2. Examples 2 to 11 and Comparative Examples 1 and 2

A solution of a solid content of 25% obtained by dissolving 25 g of a phenoxy resin shown in Table 1 in 75 g of an organic solvent (main component) and a solution of a solid content of 60% obtained by dissolving 60 g of a hardening agent having a blocked isocyanate group in 40 g of an organic solvent (hardening agent) were respectively prepared, and they are mixed according to the rate shown in Table 1 to obtain 12 compositions. Each of the thus obtained compositions was applied to a steel structure in the same manner as in Example 1, and was treated in the same manner as in Example 1 to obtain a lightweight foam concrete reinforced with the steel structure.

The results of performance tests of the thus obtained lightweight foam concretes are shown in Table 2.

TABLE 1

| Examples, Comparative Examples | Examples | | | | | | | | | | Comparative Examples | |
|---|---|---|---|---|---|---|---|---|---|---|---|---|
| | 2 | 3 | 4 | 5 | 6 | 7 | 8 | 9 | 10 | 11 | 1 | 2 |
| Phenoxy resin[1] | A | B | B | A | B | B | C | D | B | B | A | A |
| Hardening agent having blocked isocyanate group[2] | A | A | A | B | B | B | A | B | A | B | A | A |
| Solvent[3] for resin | A | A | A | A | A | A | A | A | B | C | A | A |
| for hardening agent | D | D | D | D | D | D | D | D | B | C | D | D |

TABLE 1-continued

| Examples, Comparative Examples | Examples | | | | | | | | | | Comparative Examples | |
|---|---|---|---|---|---|---|---|---|---|---|---|---|
| | 2 | 3 | 4 | 5 | 6 | 7 | 8 | 9 | 10 | 11 | 1 | 2 |
| Main component (parts) | 78.6 | 90.6 | 95.6 | 78.6 | 90.6 | 95.6 | 95.6 | 90.6 | 95.6 | 90.6 | 99.14 | 70.7 |
| Hardening agent (parts) | 21.4 | 9.4 | 4.4 | 21.4 | 9.4 | 4.4 | 4.4 | 9.4 | 4.4 | 9.4 | 0.86 | 29.3 |
| Total | 100.0 | 100.0 | 100.0 | 100.0 | 100.0 | 100.0 | 100.0 | 100.0 | 100.0 | 100.0 | 100.0 | 100.0 |
| Ratio of main component/hardening agent[4] | 60/40 | 80/20 | 90/10 | 60/40 | 80/20 | 90/10 | 90/10 | 80/20 | 90/10 | 80/20 | 98/2 | 50/50 |

Notes:
[1]Phenoxy resin
A: trade name: PKHH, produced by Union Carbide Corp.
B: trade name: Phenotohto YP-50-C25, produced by Tohto Kasei Co., Ltd.
C: trade name: PKHC, produced by Union Carbide Corp.
D: trade name: Phenotohto YP-50-NT25, produced by Tohto Kasei Co., Ltd.
[2]hardening agent having blocked isocyanate group
A: trade name: Coronate AP-60, produced by Nippon Polyurethane Industry Co., Ltd. 2,4-tolylene diisocyanate blocked by phenol
B: trade name: EHX-124-3, produced by Asahi Denka Kogyo K.K. 2,4-tolylene diisocyanate blocked by methyl ethyl ketoxime
[3]Solvent
A: acetoethylene glycol monoethyl ether
B: 1,1,2,2-tetrachloroethane
C: pentachloroethane
D: n-butyl acetate
[4]solid content weight ratio

COMPARATIVE EXAMPLE 3

A steel structure member similar to that in Example 1 is immersed for 1 min in a cement-based coating agent comprising 50 parts of cement, 50 parts of silica sand and 50 parts of water, and is taken out. After leaving the structure member thus coated to stand at room temperature for 15 min, baking was conducted at 50° C. for 40 min to obtain a steel structure coated thereon with a film of 50 μm in hardened film thickness.

The thus obtained steel structure is fixed to a central part of a mold for molding a building material, and a mixture of 50 parts of cement, 50 parts of silica sand, 50 parts of water and 0.3 part of an aluminum paste (trade name: SAP-720N, a product by SHOWA ALUMINUM CORPORATION) is poured into the mold.

After leaving the poured material to stand for 30 min, the mold was removed, and the demolded product was placed in an autoclave and subjected to reaction under 180° C. and 10 atm for 8 hours to obtain a lightweight foam concrete.

The results of performance tests on the thus obtained lightweight foam concrete are shown in Table 2.

TABLE 2

| | Breaking property | Adhesion | Anticorrosive property |
|---|---|---|---|
| Example 1 | none | good | 1500 |
| Example 2 | none | good | 1500 |
| Example 3 | none | good | 1500 |
| Example 4 | none | good | 1500 |
| Example 5 | none | good | 1500 |
| Example 6 | none | good | 1500 |
| Example 7 | none | good | 1500 |
| Example 8 | none | good | 1500 |
| Example 9 | none | good | 1500 |
| Example 10 | none | good | 1500 |
| Example 11 | none | good | 1500 |
| Comparative Example 1 | present | good | 500 |
| Comparative Example 2 | present | poor | 900 |
| Comparative Example 3 | none | partially peeled | 1000 |

Notes:
(1) Breaking property: The presence of "cracks" in the obtained lightweight foam concrete is visually checked.
(2) Adhesion: The lightweight foam concrete is struck by a hammer one time to break the concrete, and the adhesion of the concrete component to the steel structure is visually evaluated according to the following criteria.
Good: The concrete component is adhered to the steel structure without any gap.
Partially peeled: The concrete component is adhered to the steel structure in spots.
Poor: The concrete component is substantially not adhered to the steel structure.
(3) Anticorrosive property: A specimen comprising a lightweight foam component left in a thickness of 3 mm on the steel structure is placed in a salt spray tester (JIS-K5400-7,8), and the period of time required for generation of corrosion is measured.

The above results clearly show that in any of Examples 1 to 11, the lightweight foam concrete is favorably adhered to the steel structure without cracks, and the steel structure has excellent anticorrosive property, or rust-proofness.

On the other hand, in the case of Comparative Example 1 in which the amount of the hardening agent having the blocked isocyanate group is less than 5% by weight, the breaking property of the lightweight foam concrete and the anticorrosive property of the steel structure are poor. In the cases of Comparative Example 2 in which the amount of the hardening agent is over 40% by weight and Comparative Example 3 which is according to prior art, adhesion of the lightweight foam concrete and steel structure and the anticorrosive property of the steel structure are poor, as clearly recognized. By coating the steel structure with the composition according to the present invention, it is possible to enhance adhesion between the lightweight foam concrete and the steel structure so that decomposition or peeling will not occur even under high temperature, high pressure and high alkalinity, to obtain a steel structure having excellent anticorrosive property, and to obtain a lightweight foam concrete reinforced with the steel structure capable of maintaining excellent performance for a long time.

Obviously many modifications and variations of the present invention are possible in the light of the above teachings. It is therefore to be understood that within the scope of the appended claims in the invention may be practiced otherwise than as specifically described.

What is claimed is:

1. A resin composition for a steel structure for reinforcing a lightweight foam concrete, comprising 60 to 95% by weight of a phenoxy resin and 5 to 40% by weight of a hardening agent having a blocked isocyanate group.

2. A resin composition as claimed in claim 1, wherein the amount of said hardening agent is 10 to 40% by weight.

3. A resin composition as claimed in claim 1, wherein said hardening agent having blocked isocyanate group is obtained by reacting a polyisocyanate compound with a compound having active hydrogen.

4. A resin composition as claimed in claim 3, wherein said polyisocyanate compound is a compound having at least two isocyanate groups in one molecle.

5. A resin composition as claimed in claim 3, wherein said compounds having active hydrogen are alcohols.

6. A resin composition as claimed in claim 3, wherein said compounds having active hydrogen are compounds having a phenolic hydroxyl group.

7. A resin composition as claimed in claim 3, wherein said compounds having active hydrogen are oximes.

8. A resin composition as claimed in claim 3, wherein said compounds having active hydrogen are lactams.

9. A resin composition as claimed in claim 3, wherein said hardening agent having blocked isocyanate group is 2,4-tolylene diisocyanate blocked by phenol.

10. A resin composition as claimed in claim 3, wherein said hardening agent having blocked isocyanate group is 2,4-tolylene diisocyanate blocked by methyl ethyl ketoxime.

11. A resin composition for a steel structure for reinforcing a lightweight foam concrete as claimed in claim 1 wherein said phenoxy resin and said hardening agent are mixed and dissolved in an organic solvent.

12. A method of producing a lightweight foam concrete reinforced by a steel structure coated by a resin composition including steps of:

coating the steel structure by a mixture of organic solvent and a resin composition comprising 60 to 95% by weight of phenoxy resin and 5 to 40% by weight of a hardening agent having blocked isocyanate group;

hardening said resin composition which covers over the steel structure by baking at 100 to 220 C. for 10 to 90 min;

embedding said coated reinforcing steel structure in a lightweight foam concrete component; and reacting said lightweight foam concrete component to produce a lightweight foam concrete reinforced with the coated steel structure.

* * * * *